(12) United States Patent
Belimpasakis et al.

(10) Patent No.: US 9,467,530 B2
(45) Date of Patent: Oct. 11, 2016

(54) METHOD, APPARATUS, NETWORK ENTITY, SYSTEM AND COMPUTER PROGRAM PRODUCT FOR SHARING CONTENT

(75) Inventors: Petros Belimpasakis, Tampere (FI); Catalin Ionescu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1378 days.

(21) Appl. No.: 11/279,281

(22) Filed: Apr. 11, 2006

(65) Prior Publication Data

US 2007/0239867 A1    Oct. 11, 2007

(51) Int. Cl.
*H04L 29/08*    (2006.01)
*H04L 29/06*    (2006.01)

(52) U.S. Cl.
CPC ............. *H04L 67/303* (2013.01); *H04L 69/24* (2013.01); *H04L 67/04* (2013.01); *H04L 67/06* (2013.01); *H04L 67/24* (2013.01)

(58) Field of Classification Search
CPC ... H04L 69/18; H04L 67/06; H04L 12/5825; H04L 67/303
USPC ........................................................ 709/224
See application file for complete search history.

(56) References Cited

U.S. PATENT DOCUMENTS

| | | | |
|---|---|---|---|
| 7,003,577 B1* | 2/2006 | Ueda et al. .................... | 709/230 |
| 8,141,115 B2* | 3/2012 | Wohlert et al. ................ | 725/48 |
| 2002/0161884 A1* | 10/2002 | Munger et al. ............... | 709/224 |
| 2003/0134648 A1* | 7/2003 | Reed et al. .................... | 455/456 |
| 2004/0003039 A1* | 1/2004 | Humphrey et al. .......... | 709/204 |
| 2005/0188399 A1 | 8/2005 | Tischer | |
| 2005/0226166 A1* | 10/2005 | Agrawal et al. ............. | 370/252 |
| 2005/0289237 A1 | 12/2005 | Matsubara et al. | |
| 2006/0075096 A1* | 4/2006 | Ueda et al. .................... | 709/224 |
| 2006/0161585 A1* | 7/2006 | Clarke et al. ............... | 707/104.1 |
| 2006/0190616 A1* | 8/2006 | Mayerhofer et al. ......... | 709/231 |
| 2007/0226303 A1* | 9/2007 | Provo ........................... | 709/206 |
| 2008/0129498 A1* | 6/2008 | Howarter et al. ............. | 340/541 |
| 2008/0186966 A1* | 8/2008 | Lobig ........................... | 370/390 |
| 2008/0189099 A1* | 8/2008 | Friedman et al. .............. | 704/8 |
| 2008/0205354 A1* | 8/2008 | Makela et al. ................ | 370/338 |
| 2010/0153577 A1* | 6/2010 | Wohlert et al. ............... | 709/231 |
| 2013/0080553 A1* | 3/2013 | Rosen et al. .................. | 709/206 |

FOREIGN PATENT DOCUMENTS

KR    10-2005-0001466    1/2005

OTHER PUBLICATIONS

Russian Office action for corresponding RU App. No. 2008143455/09(056609) dated Mar. 30, 2010, pp. 1-5.
Office Action for related European Patent Application No. 07 713 059.9 dated Jan. 28, 2013, pp. 1-4.
Korean office for corresponding KR application No. 10-2008-7019675 dated Aug. 30, 2010, pp. 1-8.
Supplementary European Search Report for related European Patent Application No. 07 713 059 dated Jan. 3, 2013, pp. 1-3.

* cited by examiner

*Primary Examiner* — Jerry Dennison
(74) *Attorney, Agent, or Firm* — Ditthavong & Steiner, P.C.

(57) ABSTRACT

A method, apparatus, network entity, system and computer program product are provided for content sharing. In particular, a technique is provided whereby an individual desiring to share content including, for example, photograph albums, music or video files, or the like, need only select the individual(s) with whom he or she would like to share the content, and the device on which he or she is operating will determine all of the necessary protocols, connectivity bearers, and the like, for sharing the content, as well as the appropriate device with which the content should be shared.

52 Claims, 6 Drawing Sheets

METHOD, APPARATUS, NETWORK ENTITY, SYSTEM AND COMPUTER PROGRAM PRODUCT FOR SHARING CONTENT

FIELD

Exemplary embodiments of the present invention relate, generally, to sharing content and, in particular, to a technique for seamlessly sharing content in a manner that is transparent to the user.

BACKGROUND

With the usage of advanced features in the latest personal devices (e.g., cellular telephones, personal digital assistants (PDAs) pagers, and the like) the creation and consumption of digital content has become part of many individuals' everyday life. This includes taking digital photos, listening to digital music, watching short videos, and more. Apart from self-creation and self-consumption, the concept of content sharing is stronger than ever. People want to be able to share their content on many different levels with others including, for example, their family, friends and colleagues.

One problem arises, however, from the fact that there are many different protocols or services that can be used for exchanging content, and each protocol or service may be ideal for certain situations, but not for others. Examples of such services include E-mail, which is mostly used for person-to-person communication, is targeted to devices connected to the Internet, and requires certain infrastructure (e.g., E-mail servers, etc.); Multimedia Messaging Service (MMS), which is used in the mobile domain and is targeted for exchanging small media files; and Universal Plug and Play (UPnP)/Audio Video (AV), which is targeted to device-to-device communications and, while it supports large files, is targeted mainly for personal devices, wherein the sending and receiving devices are typically owned by the same person.

Other examples of services or protocols used for exchanging content include Atom, an XML-based syndication format that is mainly used for uploading content to weblogs; Web Distributed Authoring and Versioning (WebDAV), which is an enhancement to the HTTP protocol that enables documents to be written via HTTP, is mainly used in the enterprise domain, supports large files, and requires numerous settings; Peer-to-Peer networks, which are used for public user-to-user exchange of large files; and Bluetooth Object Exchange (OBEX), which is targeted to device-to-device content exchange where devices are in proximity of one another.

Because the majority of devices, both fixed and mobile, support many of these services and protocols, it is up to the user desiring to transmit or share his or her content with other individuals to select the appropriate one for each particular instance (i.e., depending upon, for example, what content he or she is transmitting and/or where, in relation to his or her device, the intended recipient is located).

In addition to the numerous available services and protocols, there are also numerous connectivity bearers that may be used, wherein, like the services and protocols, each may be best for a specific instance. Examples of such connectivity bearers include Cellular Packet Radio, used for mobile devices; Wireless Local Area Network (WLAN) Infrastructure, used both in fixed and mobile devices typically for Internet connectivity; WLAN Ad-hoc, which is used primarily in mobile devices for proximity services (e.g., mobile-to-mobile connectivity); Bluetooth, which, like WLAN Ad-hoc, is typically used in mobile devices for proximity services; and the fixed Internet, which is used by static devices for Internet connectivity.

A user may, likewise, be required to determine and specify which connectivity bearer should be used depending upon, among other things, the content he or she is sharing and, as above, where his or her device is located with respect to the intended recipient.

To make things even more complicated, many individuals have more than one device (e.g., a cellular telephone, PDA, pager, home media center or content server, personal computer (PC), laptop, etc.), wherein each device may have a different range of connectivity (e.g., short or wide) and different capabilities for handing different types and sizes of content. For example, while a PC may support E-mail, UPnP/AV, Peer-to-Peer, and the like, an individual's cellular telephone may support Bluetooth, MMS and E-mail.

In order to share content, a user may be required to determine, among other things, which service or protocol to use, which connectivity bearer to use, and to which device associated with an intended recipient to transmit the content. In order to make these determinations, the user may be required to determine, for example, whether the sending and the receiving devices support the same protocols, whether the receiving device is in proximity and, if not, whether it can be reached using an alternative method, whether the receiving device can handle (render) the specific content type or the size of the shared file (i.e., does the receiving device have the requisite memory space), or how will the sending and receiving devices exchange settings (e.g., MAC/IP addresses, usernames, passwords, security keys, directory paths, etc.).

In addition to the foregoing, in many instances users are able to invite other individuals to remotely access content stored on the user's home PC or server, or even his or her mobile device. While beneficial, this too may cause even further issues in terms of how the invitees will know how or where to access the content, particularly if the user moves the content from one device (e.g., his or her mobile device) to another (e.g., his or her media server).

A need, therefore, exists for an easier way to share content with others that does not require a user to make difficult determinations in terms of how and to where to transmit the content.

BRIEF SUMMARY

In general, exemplary embodiments of the present invention provide an improvement over the known prior art by, among other things, refocusing existing device-centric content sharing to a more people-centric method of sharing content. In particular, exemplary embodiments enable an individual to merely select to whom they would like to share the content, and the individual's device, rather than the individual himself, will make the aforementioned decisions regarding how and to where to send the content and/or from where and how to access the content. The determinations may be based, for example, on the type and/or size of the content being shared, the capabilities of various devices associated with the intended recipient or sharing party (i.e., a party offering various content files for the user to access) and/or the proximity of the intended recipient's/sharing party's devices, to name a few. In order to make these decisions, the electronic device of one exemplary embodiment accesses a personal resource file or database associated with the intended recipient or sharing party that provides information regarding each of the intended recipient's/sharing party's devices.

In accordance with one aspect, a method is provided of sharing content. In one exemplary embodiment, the method includes: (1) accessing a resource file associated with a party, wherein the resource file comprises information relating to one or more devices associated with the party; and (2) determining a manner in which to share one or more content files with the party based at least in part on the information included in the resource file.

According to yet another aspect, a network entity is provided for sharing content. In one exemplary embodiment, the network entity includes a processor and a memory in communication with the processor. The memory of this exemplary embodiment stores one or more resource files corresponding with a respective one or more parties, wherein respective resource files comprise information relating to one or more devices associated with the respective parties, and wherein respective resource files are capable of being used to determine a manner in which to share one or more content files with the respective parties. The memory may further store an application executable by the processor, wherein the application is configured, upon execution, to provide access to the resource files.

According to another aspect, an apparatus is provided that is capable of sharing content. In one exemplary embodiment the mobile device includes a processor and a memory in communication with the processor that stores an application executable by the processor, wherein the application is configured, upon execution, to: (1) access a resource file associated with a party, wherein the resource file comprises information relating to one or more devices associated with the party; and (2) determine a manner in which to share one or more content files with the party based at least in part on the information included in the resource file.

In accordance with yet another aspect, a computer program product is provided for sharing content. The computer program product contains at least one computer-readable storage medium having computer-readable program code portions stored therein. The computer-readable program code portions of one exemplary embodiment include: (1) a first executable portion for accessing a resource file associated with a party, wherein the resource file comprises information relating to one or more devices associated with the party; and (2) a second executable portion for determining a manner in which to share one or more content files with the party based at least in part on the information included in the resource file.

In accordance with another aspect, a system for content sharing is provided. In one exemplary embodiment, the system includes a database comprising one or more resource files corresponding with a respective one or more parties, and an apparatus configured to access at least one of the resource files. Respective resource files of this exemplary embodiment include information relating to one or more devices associated with the respective parties, and the apparatus is configured to determine, based at least in part on this information, a manner in which to share one or more content files with the party corresponding with the accessed resource file.

BRIEF DESCRIPTION OF THE SEVERAL VIEWS OF THE DRAWING(S)

Having thus described exemplary embodiments of the invention in general terms, reference will now be made to the accompanying drawings, which are not necessarily drawn to scale, and wherein:

DETAILED DESCRIPTION

Figure 1:
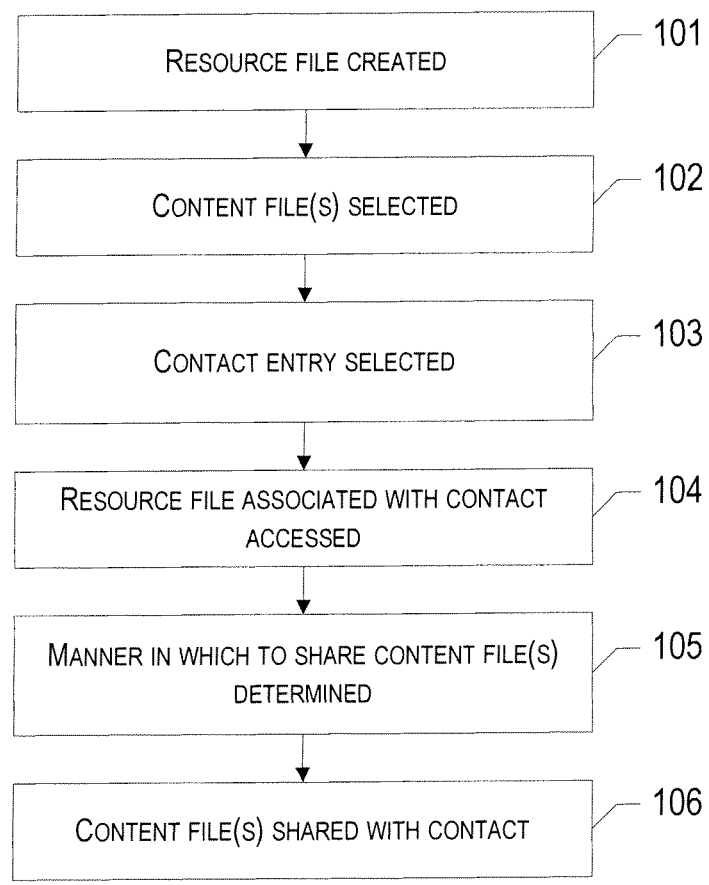
FIG. 1 is a flow chart illustrating the steps which may be taken in order to share content in accordance with exemplary embodiments of the present invention.

Exemplary embodiments of the present invention now will be described more fully hereinafter with reference to the accompanying drawings, in which some, but not all embodiments of the inventions are shown. Indeed, exemplary embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview

In general, exemplary embodiments of the present invention involve the generation of personal resource files or databases that are associated with respective individuals and include information relating to, for example, the protocols, capabilities, addresses, bearers and security associations relating to each of the individual's personal devices (e.g., his or her cellular telephone, PDA, pager, PC, laptop, home media server, etc.). When another individual (referred to herein as the "sender") wishes to share content, such as digital photographs, music files, or the like, with the individual with whom the resource file is associated (referred to herein as the "intended recipient"), the sender need only select the contact entry associated with the intended recipient in the sender's device contact list (e.g., an address or phone book application operating on the electronic device), and the device will access the resource file associated with the intended recipient and determine, based, for example, on the type and size of the content to be shared, the proximity and availability of the intended recipient's device, and the like, what service or protocol and connectivity bearer to use, as well as to which of the intended recipient's devices to send the content.

In addition, exemplary embodiments of the present invention may be used to facilitate the offering of content to others. As used herein "offering" refers to the instance where an individual (referred to herein as the "sharing party") invites other individuals (referred to as the "visitors") to access content, such as photo albums or the like, stored on various devices associated with the sharing party. In this exemplary embodiment, the personal resource file associated with the sharing party may include a list of albums the sharing party desires to offer along with links to the devices on which respective albums are stored and information relating to the supported protocols, configurations, and the like of those devices. When a visitor wishes to access content made accessible by the sharing party, the visitor's device retrieves the resource file associated with the sharing party and uses it to determine how best to gain access to the content.

As is discussed in more detail below, the personal resource files may be stored on a server that is publicly accessible via a Wide Area Network (WAN) (e.g., the Internet). In this exemplary embodiment, the sender or visitor devices may browse to an address (e.g., a URL address) provided by the intended recipient or sharing party in order to access the corresponding resource file. Alternatively, the resource files may be maintained by a Presence Server, wherein the information contained in the resource files may be provided to mobile devices as part of the Presence Service provided by the mobile device operator. In yet another exemplary embodiment, the resource files may be stored directly on the sender/visitor devices themselves. In this latter embodiment, the device may periodically synchronize the resource files stored on the device with, for example, those stored on a central server or with a peer-to-peer device.

Method of Seamlessly Sharing Content

Reference is now made to FIG. 1, which illustrates the steps which may be taken in order to alleviate the burden placed on individuals seeking to share content with and/or offer content to others. As shown the process begins at Step 101, wherein a personal resource file or database is created for a particular individual or party. As discussed above, the resource file includes information, such as the protocols and connectivity bearers supported by, the capabilities of, and/or the security associations relating to respective devices operated by, or otherwise associated with, the individual. In particular, each device, for which information is included in the personal resource file, supports content sharing via one or more content transfer protocols (e.g., UPnP, WebDAV, Atom, etc.). The devices further have one or more connectivity interfaces (e.g., WLAN, Bluetooth, General Packet Radio Service (GPRS), etc.), and the device services are addressable using one or more Internet/proximity addresses (e.g., URLs, MAC addresses, etc.). The personal resource file includes a description of some portion, if not all, of the foregoing.

The following provides an example of the information which may be included in a personal resource file of an individual having a cellular telephone, a PC, a media server and a weblog, all of which support content sharing:

| | |
|---|---|
| Cellular Telephone | Bluetooth address: 11:22:33:44:55:66<br>WLAN address: 77:88:99:00:11:22<br>MSISDN: +358501234567<br>WebDAV server currently running at:<br>130.233.22.33:80/webdav |
| Personal Computer | UPnP/AV server at<br>http://mypc.isp.com:5678/UPnP |
| Media Server | UPnP/AV server at<br>http://mymedia.isp.com:1234/UPnP<br>WebDAV server at<br>http://mymedia.isp.com/webdav/ |
| Weblog | http://www.typepad.com/myname |

Figure 2:
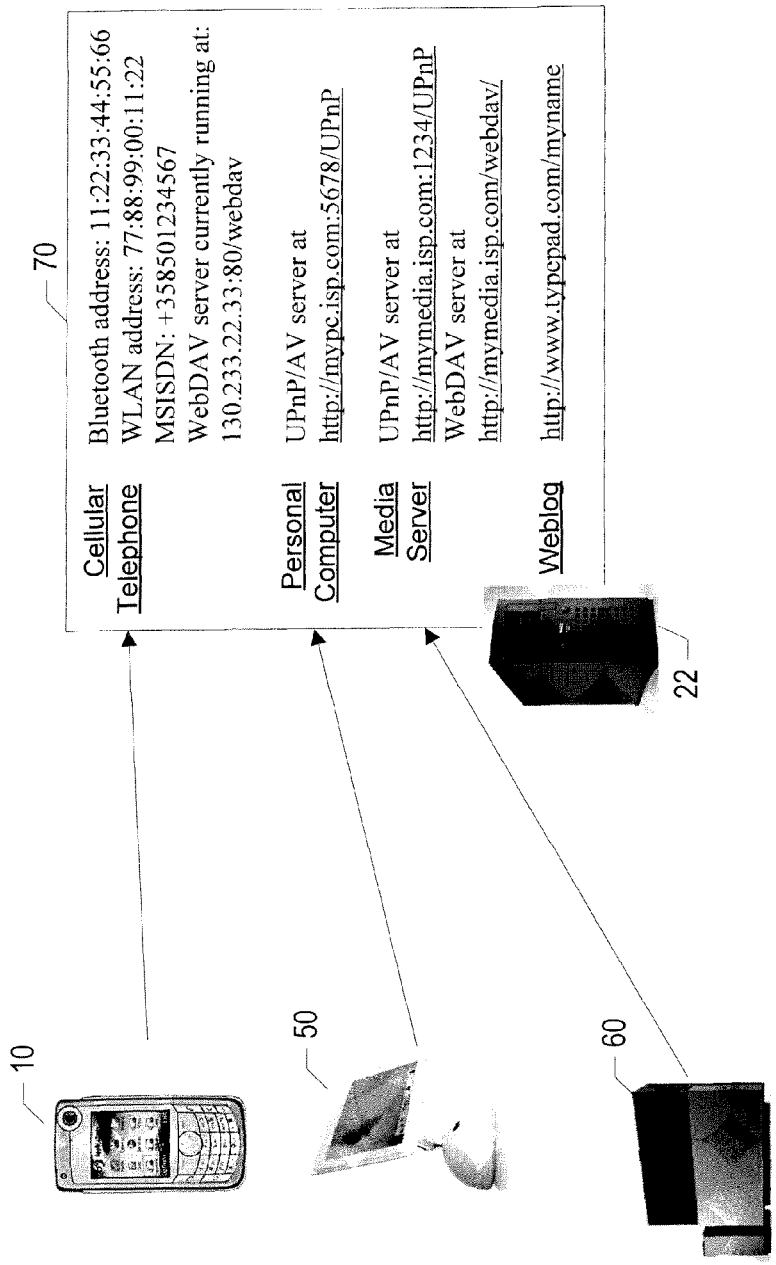
FIG. 2 illustrates an individual's devices providing information to the corresponding resource file in accordance with exemplary embodiments of the present invention.

As will be recognized by those of ordinary skill in the art, any format may be used for the resource file including, for example, Extended Markup Language (XML), Really Simple Syndication (RSS), or the like. In one exemplary embodiment, once the resource file has been created, the devices themselves are responsible for providing the information stored therein. To illustrate, FIG. 2 represents an individual's cellular telephone 10, PC 50, and media server 60 communicating with a host server 22, on which the individual's corresponding resource file 70 is stored, for the purpose of providing information related to the respective devices.

In addition to the foregoing, Step 101 may further include providing a list within the personal resource file of one or more content files that are stored on respective devices associated with the individual, and which may be accessed by certain other individuals (i.e., content files being offered to visitors). The resource file may further include information regarding how best to access those content files (e.g., an address where they can be located, a method, protocol and/or configuration to use when doing so, etc.). According to exemplary embodiments, therefore, individuals can avoid uploading content files, such as photo albums, music files, and the like, to publicly available web sites and can, instead, just provide information regarding how to access the content directly on their devices. To illustrate, the following provides an exemplary resource file including information regarding two photo albums (BestOfShopping and Summer2005) being offered:

| | |
|---|---|
| Cellular Telephone | Bluetooth address: 11:22:33:44:55:66<br>WLAN address: 77:88:99:00:11:22<br>MSISDN: +358501234567<br>WebDAV server currently running at:<br>130.233.22.33:80/webdav<br>Photo Album: BestOfShopping:<br>    Access rights: John, Mary<br>    Last updated: 1/20/2006 11:02:32<br>    Proximity: WLAN adhoc = "Anna": UPnP/AV<br>    "192.168.1.1": folder = "BestOfShopping"<br>    Remote: HTTP/HTML: URL=<br>    http://myphone.operator/albums/BestOfShopping |
| Personal Computer | UPnP/AV server at http://mypc.isp.com:5678/UPnP |
| Media Server | UPnP/AV server at http://mymedia.isp.com:1234/UPnP<br>WebDAV server at http://mymedia.isp.com/webdav/<br>Photo Album: Summer2005:<br>    Access rights: John<br>    Last updated: 8/20/2005 22:01:44<br>    Remote: WebDAV: URL =<br>    http://mymedia.isp.com/webdav/Summer2005<br>    Remote: UPnP: URL =<br>    http://mymedia.isp.com:1234/UPnP/Summer2005 |
| Weblog | http://www.typepad.com/myname |

As shown, in addition to specifying the available content files and their location, the resource file may specify which third parties (i.e., visitors) have access rights to the stored content files, discussed in detail below.

Figure 3:
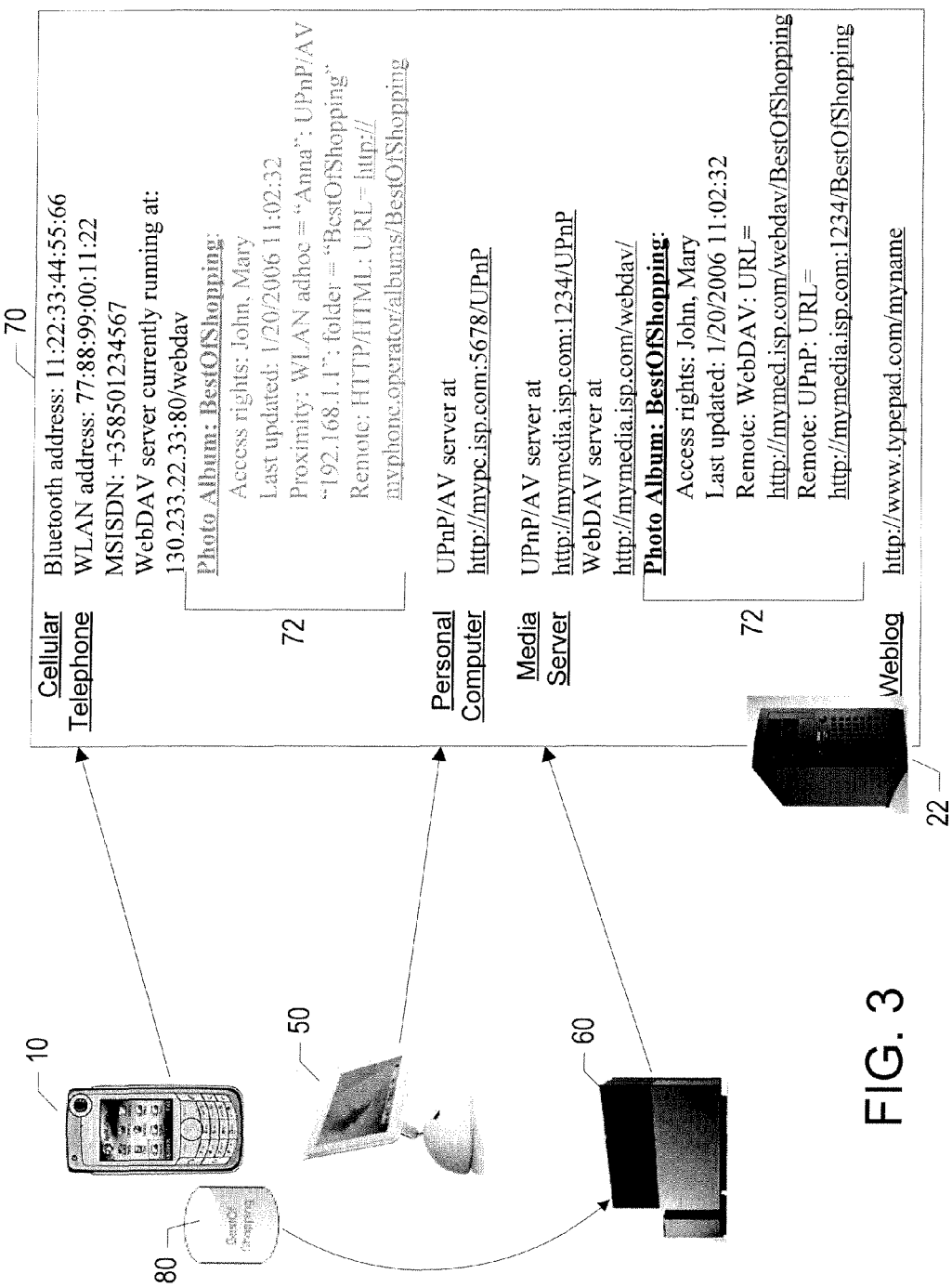
FIG. 3 illustrates an individual's devices updating the information stored in the corresponding resource file in accordance with exemplary embodiments of the present invention.

In one exemplary embodiment, where information associated with a particular device changes (e.g., the capabilities of an individual's cellular telephone improve because of additional services purchased by the individual), the device may automatically update the resource file. In particular, the device may access the resource file (in a manner described below with reference to Step 104), and modify the information included, such that the resource file will maintain up-to-date information regarding each of the individual's devices. Respective devices may further update the resource file when a particular content file is moved from one device to another, or when the content file has been updated (e.g., new photographs have been added to the album). To illustrate, FIG. 3 represents the situation where an individual has moved the content file for the photo album BestOfShopping 80 from his or her cellular telephone 10 to his or her media server 60. As shown, in one exemplary embodiment, the cellular telephone 10 will update the individual's resource file 70 by deleting or removing the reference to the photo album that has been removed from the phone 72 from its portion of the resource file 70. In addition, the media server 60 of this exemplary embodiment will update the resource file 70 by adding the removed reference 72 to its section of the resource file 70. According to this embodiment, visitors need not be individually informed when and to where content files, to which they have been granted access, have been moved.

Returning to FIG. 1, the process continues, in Step 102, where an individual (e.g., a sender) selects one or more content files, for example, saved on his or her device, for the purpose of transmitting the file(s) to an intended recipient. As discussed above, the content files may include, for example, digital photographs, music files, video clips, and the like. As will be recognized by those of ordinary skill in the art, in the instance where the individual desires to access (rather than transmit) content stored on a device associated with a sharing party, Step 102 may be bypassed and the process continues directly to Step 103.

Once the content file(s) have been selected (or once the resource file has been created, in the instance where the individual associated with the resource file has offered content for sharing), the sender/visitor may then select a contact from his or her address or phone book to which to transmit the selected content file(s) or whose content he or she would like to access. (Step 103).

In one exemplary embodiment, this may involve highlighting and selecting the name, phone number, or E-mail address of the contact as displayed on a display screen of the electronic device. Alternatively, where, for example, the electronic device responds to voice commands, Step 103 may involve speaking the name of the contact or some other word or phrase associated therewith (e.g., "mom," "secretary," etc.).

At this point, the device on which the sender is operating will access the resource file associated with the contact selected. (Step 104). In one exemplary embodiment, the personal resource files or databases associated with various individuals may be stored on a server that is publicly accessible via, for example, a WAN (e.g., the Internet). In this exemplary embodiment, respective contact entries of an individual's content list may include the address (e.g., a URL address) of the corresponding personal resource file (e.g., http://www.isp.com/my_resource.xml). When the sender selects the contact entry, the device may browse to the address included in the contact entry in order to access the resource file. In this exemplary embodiment, in order for individual devices, for which information is included in respective personal resource files, to periodically update that information, as discussed above, the devices will simply browse to the address and update the information stored at that location.

In another exemplary embodiment, a cellular network operator's Presence Service may be used to store and provide access to the various personal resource files. As will be recognized by those of ordinary skill in the art, Presence refers to the ability and willingness of a user to communicate information regarding the location and availability of his or her device(s) across various sets of services and devices. Presence information is typically linked to the device's telephone number and is published, in the form of a Presence Document, to other devices having the corresponding telephone number stored thereon (e.g., in the form of a contact entry relating to the user). When an individual accesses his or her contact list, he or she can view the Presence Document in order to see whether the corresponding contact is available or, for example, in a meeting. Presence enablers are currently installed by many cellular operators in order to provide their customers services such as, Instant Messaging (IMing), push-to-talk, and the like.

According to this exemplary embodiment, the existing Presence Service offered by cellular network operators may be used to provide a "sharing service." In particular, the Presence Documents used to publish the Presence information relating to a particular individual or device may include the personal resource file associated with that individual. In other words, in addition to using the Presence Service to advertise presence information, an individual can use the service to also advertise protocol, bearer, capability and security information relating to his or her devices, as well as information regarding various content files that are being offered to third parties.

The following information may be included in the Presence Document according to exemplary embodiments of the present invention: Sharing Service availability, indicating a user's willingness to communicate using this service (e.g., "open" may indicate that the user is willing to be contacted, while "closed" may indicate that the user is not willing to communicate using the sharing service); a Sharing Service Identifier, which is published to indicate the type of service described by the tuple; a list of devices in which the Sharing Service is running (e.g., a list of hardware devices capable of running the service), whereby content may be delivered according to the content type, device capabilities and priorities of the devices running the Sharing Service; and the information discussed above relating to the individual devices (e.g., protocols, bearers, capabilities, etc.).

The following Presence Document illustrates an example of a Sharing Service running on four devices, namely a mobile phone, a home server, a public media server, and a weblog server. The mobile phone of this example is capable of receiving content over Bluetooth, MMS and WLAN. Content may be sent to the home server via UPnp technology. The media server may be exposing a UPnP and a WebDAV interface, and the weblog server may be accessed over HTTP.

```
<?xml version="1.0" encoding="UTF-8"?>
    <presence xmlns="urn:ietf:params:xml:ns:pidf"
        xmlns:dm="urn:ietf:params:xml:ns:pidf:data-model"
        xmlns:rp="urn:ietf:params:xml:ns:pidf:rpid"
        xmlns:new="urn:ietf:params:xml:ns:pidf:newnamespace"
        xmlns:xsi="http://www.w3.org/2001/XMLSchema-instance">
        <tuple id="sg89ae">
            <status>
                <basic>open</basic>
            </status>
            <new:service-id>org.sharingservice-session</new:service-id>
            <dm:deviceID>imsi:0248952</dm:deviceID>
            <dm:deviceID>mac:8asd7d7d71</dm:deviceID>
```

```
            <dm:deviceID>mac:8asd7d7d72</dm:deviceID>
            <dm:deviceID>mac:8asd7d7d72</dm:deviceID>
            <contact>sip:someone@example.com</contact>
            <contact priority="1.0">bluetooth: 11:22:33:44:55:66</contact>
            <contact priority="1.0">wlan: 77:88:99:00:11:22 </contact>
            <contact priority="1.0">msisdn:+3583429889</contact>
            <contact priority="1.0">webdav:http://130.233.22.33:80/webdav</contact>
            <contact priority="1.0">upnp:http://120.120.1.1/something</contact>
            <contact priority="1.0">upnp:http://120.120.1.1/something</contact>
            <contact priority="1.0">webdav:http://120.120.1.1/webdav</contact>
            <contact priority="1.0">weblog:http://www.typepad.com/myname</contact>
        </tuple>
        <dm:device id="phone100">
            <dm:deviceID> imsi:0248952</dm:deviceID>
        </dm:device>
        <dm:device id="pcHomeServer">
            <dm:deviceID>mac:8asd7d7d71</dm:deviceID>
            <rp:user-input>idle</rp:user-input>
        </dm:device>
        <dm:device id="pcMediaServer">
            <rp:user-input>idle</rp:user-input>
            <dm:deviceID>mac:8asd7d7d72</dm:deviceID>
        </dm:device>
        <dm:device id="pcWeblogServer">
            <dm:deviceID>mac:8asd7d7d73</dm:deviceID>
            <rp:user-input>idle</rp:user-input>
        </dm:device>
</presence>
```

One advantage of this embodiment over the former (i.e., storing the resource files on a server publicly available via the Internet) is that there is no need for the contact entry to include an address associated with the resource file (i.e., there is no need for the individual associated with either the contact entry or the device to manually enter the address). In contrast, the resource file will be directly linked to the telephone number in the contact entry. When a user selects the contact, the network operator will use the telephone number to find the presence information, or Presence Document, (including the resource file) stored on the Presence Server and then provide that information to the user's device.

One disadvantage to this embodiment, however, is that because Presence Service is a service offered by cellular network operators, it is limited to use within the mobile or cellular domain. An alternative embodiment, therefore, provides a hybrid of the preceding two embodiments. In particular, according to one exemplary embodiment, the personal resource file or database may be maintained on a publicly available server (as was the case in the first embodiment described above), and the link to the resource file, rather than the file itself, may be published using the Presence Service. In other words, the Presence Document, which is linked to the individual's telephone number, will contain the address associated with the resource file, rather than the resource file itself. Electronic devices will be able to access the resource file by either browsing to the address contained in a particular contact entry (i.e., where the device is not associated with a cellular network operator), or accessing the Presence Document associated with the telephone number of the particular contact, retrieving the address, and then accessing the resource file using the address (i.e., where the device is associated with a cellular network operator).

The following illustrates how a Sharing Service may publish a link to the resource file or database in a Presence Document:

```
<?xml version="1.0" encoding="UTF-8"?>
    <presence xmlns="urn:ietf:params:xml:ns:pidf"
        xmlns:dm="urn:ietf:params:xml:ns:pidf:data-model"
        xmlns:rp="urn:ietf:params:xml:ns:pidf:rpid"
        xmlns:new="urn:ietf:params:xml:ns:pidf:newnamespace"
        xmlns:xsi="http://www.w3.org/2001/XMLSchema-instance">
        <tuple id="sg89ae">
            <status>
                <basic>open</basic>
            </status>
            <new:service-id>org.sharingservice-session</new:service-id>
            <dm:deviceID>mac:8asd7d7d71</dm:deviceID>
            <contact>http://www.sharingservice.com/myname</contact>
        </tuple>
        <dm:device id="pcInternetServer">
            <dm:deviceID>mac:8asd7d7d71</dm:deviceID>
        </dm:device>
```

In yet another exemplary embodiment, the resource files may be stored directly on the electronic device itself. The disadvantages to this embodiment, however, are that the various resource files may take up a considerable amount of the device memory, and it may be difficult for various devices, for which information is provided in the resource files, to update that information in the event of changes to their capabilities, supported protocols and/or bearers, or the like. In one exemplary embodiment, the latter disadvantage may be lessened, however, by enabling the device to periodically synchronize the resource files stored thereon with, for example, those stored on a central server (i.e., enabling various updates to be performed to the files while saved on the server rather than directly on the device) or with a peer-to-peer device.

Regardless of where the resource file is located or how it is accessed, the process continues, in Step 105, when the sender/visitor device determines the manner in which to share content with the selected contact or party. The determination may be based, at least in part, on the information included in the resource file, as well as the type and/or size of the content file(s) either selected in Step 102 or described in the accessed resource file (in the instance where the party seeks to access, rather than transmit, the content file). Determining the manner in which to share the selected content may include, for example, determining which protocol and/or connectivity bearer to use, as well as to which of the intended recipient's devices to transmit the selected content. Where the object is to access one or more content files being offered by the contact, Step 105 may include determining on which device the content is available, and what protocol, connectivity bearer and/or address to use in order to access the content file(s).

Once the manner has been selected, the device, in Step 106, shares the content with the selected contact in the manner determined in Step 105. This may include, for example, transferring the selected content to one of the devices associated with the contact, or accessing one or more content files available on the contact's device(s).

To illustrate, in one exemplary embodiment where a sender has selected the contact entry corresponding with an intended recipient having a resource file that resembles that illustrated above, once the device has retrieved the resource file, the device will first check to see whether the intended recipient is in proximity. In other words, it will check to see whether Bluetooth or WLAN Ad-hoc may be used to transmit the selected content to the intended recipient. Where the intended recipient is in proximity, the device establishes a connection with either the Bluetooth address provided in the resource file (11:22:33:44:55:66) or the WLAN address (77:88:99:00:11:22), and then uses defined higher transfer protocols to send the content. If the intended recipient is not in proximity, the device will attempt to use an alternative sharing method as described in the resource file. For example, the device may connect via remote access to the intended recipient's home computer (e.g., by accessing the UPnP server at http://mypc.isp.com:5678/UPnP)

According to one exemplary embodiment of the present invention if, while the sender/visitor is in the process of transmitting/accessing the content files, a change occurs with respect to the intended recipient/sharing party and/or his or her device(s), the device on which the sender/visitor is operating will recognize this change and proceed accordingly. For example, consider the scenario where the sharing party was originally in proximity of the visitor, causing the visitor to use Bluetooth or WLAN Ad-hoc, for example, to access the shared content files, but then moves out of proximity while the visitor is still accessing the shared content file. In this instance, the visitor device will see that the Bluetooth or WLAN Ad-hoc connection has been lost, but that the resource file indicates that the content is also accessible remotely via, for example HTTP, and will establish a connection via remote access. In one exemplary embodiment, this entire process may be transparent to the visitor.

As noted above, according to exemplary embodiments of the present invention, a sharing party may be able to specify, within his or her resource file, specific parties having access to specific content files. Where, for example, a party without access to a particular content file retrieves the sharing party's resource file, reference to that particular content file (e.g., where it is located and how it can be accessed) may not be included in the resource file retrieved. In this exemplary embodiment, the server hosting the resource file (e.g., the publicly accessible server, or the presence server), may be responsible for filtering the resource file prior to providing it to parties requesting it. In addition, parties may be required to authenticate themselves using, for example, a username and a password, prior to receiving the requested resource file.

Resource files stored on a publicly available server may further be encrypted, such that only parties having the correct decryption keys would be able to access the data. In one exemplary embodiment, the sharing party may distribute the keys to his or her friends and family using, for example, a Short Message Service (SMS) or MMS message, or E-mail. As will be recognized by those of ordinary skill in the art, any number of methods or means may be used to secure the data included in personal resource files so that parties who are not authorized to access the data are unable to do so, without departing from the spirit and scope of exemplary embodiments of the present invention.

Exemplary embodiments of the present invention provide several advantages over the prior art by, among other things, greatly reducing the burden placed on individuals seeking to share content with other individuals. In particular, according to exemplary embodiments, content sharing can be performed by simply selecting a person with whom to share the content. All of the technical issues (e.g., device/service discovery, connection establishment, data transfer, protocols to be used, etc.) are handled by the system without the user's direct involvement. Similarly, the offering of content is done transparently, such that visitors access photo albums, and the like, without knowing where they are located or how they are being accessed. Even if a connection is lost, another connection may be seamlessly created. Even where content files are moved, they can easily be accessed, without the visitor even being cognizant of the move.

Overall System and Mobile Device

Figure 4:
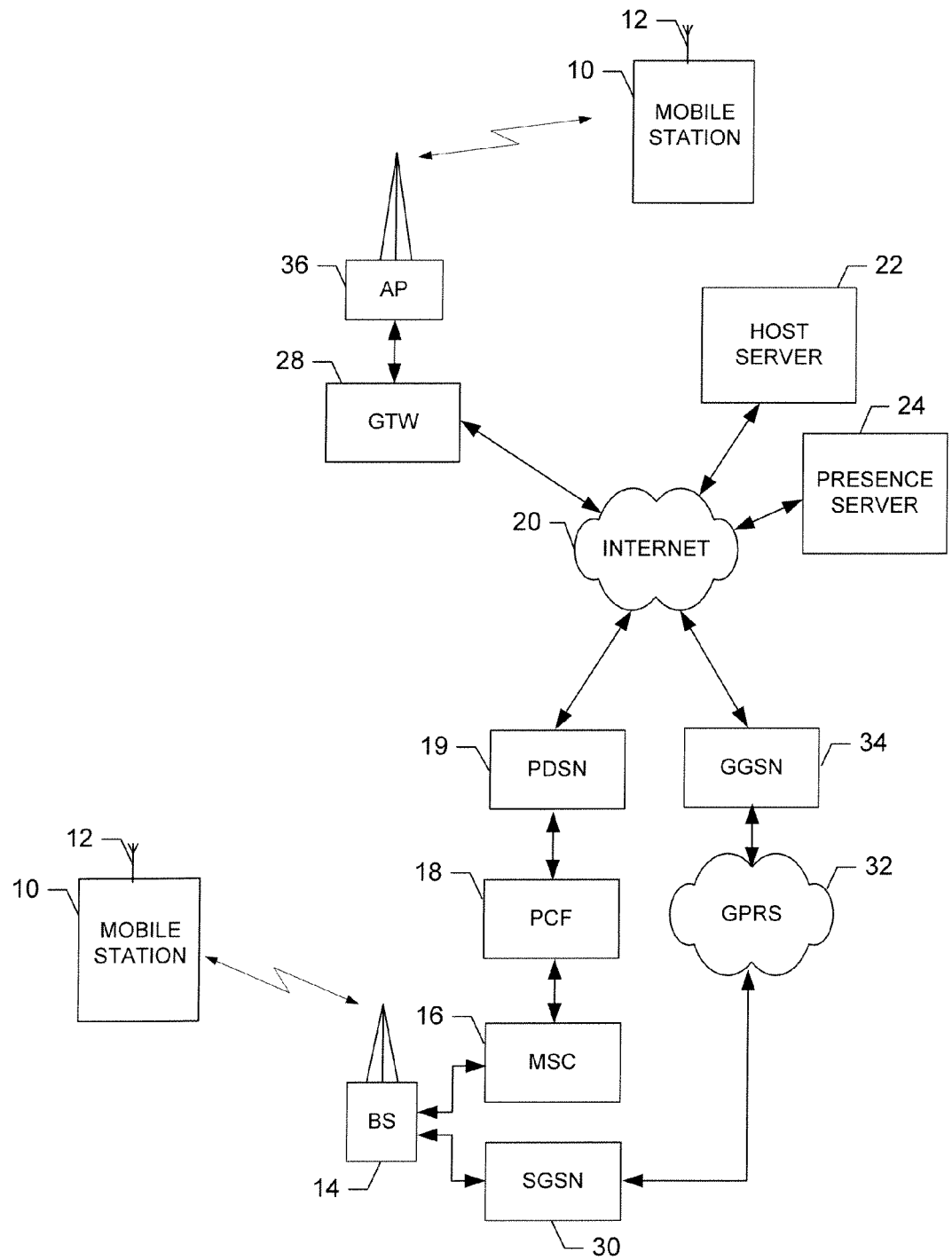
FIG. 4 is a block diagram of one type of system that would benefit from exemplary embodiments of the present invention.

Referring to FIG. 4, an illustration of one type of system that would benefit from exemplary embodiments of the present invention is provided. As shown in FIG. 4, the system can include one or more mobile stations 10, each having an antenna 12 for transmitting signals to and for receiving signals from one or more base stations (BS's) 14. The base station is a part of one or more cellular or mobile networks that each includes elements required to operate the network, such as one or more mobile switching centers (MSC) 16. As well known to those skilled in the art, the mobile network may also be referred to as a Base Station/MSC/Interworking function (BMI). In operation, the MSC is capable of routing calls, data or the like to and from mobile stations when those mobile stations are making and receiving calls, data or the like. The MSC can also provide a connection to landline trunks when mobile stations are involved in a call.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a Packet Control Function (PCF) 18, and the PCF is coupled to a Packet Data Serving Node (PDSN) 19, which is in turn coupled to a WAN, such as the Internet 20. In turn, devices such as processing elements (e.g., personal computers, server computers or the like) can be coupled to the mobile station 10 via the Internet. For example, the processing elements may include a Host Server 22 and/or a Presence Server 24, configured to store one or more personal resource files and from which the resource files may be accessed in accordance with Step 104 of FIG. 1, discussed above. As will be appreciated, the processing elements can comprise any of a number of processing devices, systems or the like capable of operating in accordance with embodiments of the present invention.

The BS 14 can also be coupled to a signaling GPRS (General Packet Radio Service) support node (SGSN) 30. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 32. The packet-switched core network is then coupled to another GTW, such as a GTW GPRS support node (GGSN) 34, and the GGSN is coupled to the Internet.

Although not every element of every possible network is shown and described herein, it should be appreciated that the mobile station 10 may be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like. More particularly, one or more mobile stations may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

One or more mobile stations 10 (as well as one or more processing elements, although not shown as such in FIG. 4) can further be coupled to one or more wireless access points (APs) 36. The AP's can be configured to communicate with the mobile station in accordance with techniques such as, for example, radio frequency (RF), Bluetooth (BT), infrared (IrDA) or any of a number of different wireless networking techniques, including WLAN techniques. The APs may be coupled to the Internet 20. Like with the MSC 16, the AP's can be directly coupled to the Internet. In one embodiment, however, the APs are indirectly coupled to the Internet via a GTW 28. As will be appreciated, by directly or indirectly connecting the mobile stations and the processing elements (e.g., Host Server 22 and/or Presence Server 24) and/or any of a number of other devices to the Internet, whether via the AP's or the mobile network(s), the mobile stations and processing elements can communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 4, in addition to or in lieu of coupling the mobile stations 10 to one or more processing elements (e.g., the Host Server 22 and/or Presence Server 24) across the Internet 20, one or more such entities may be directly coupled to one another. As such, one or more network entities may communicate with one another in accordance with, for example, RF, BT, IrDA or any of a number of different wireline or wireless communication techniques, including LAN and/or WLAN techniques. Further, the mobile station 10 and the processing elements can be coupled to one or more electronic devices, such as printers, digital projectors and/or other multimedia capturing, producing and/or storing devices (e.g., other terminals).

Figure 5:
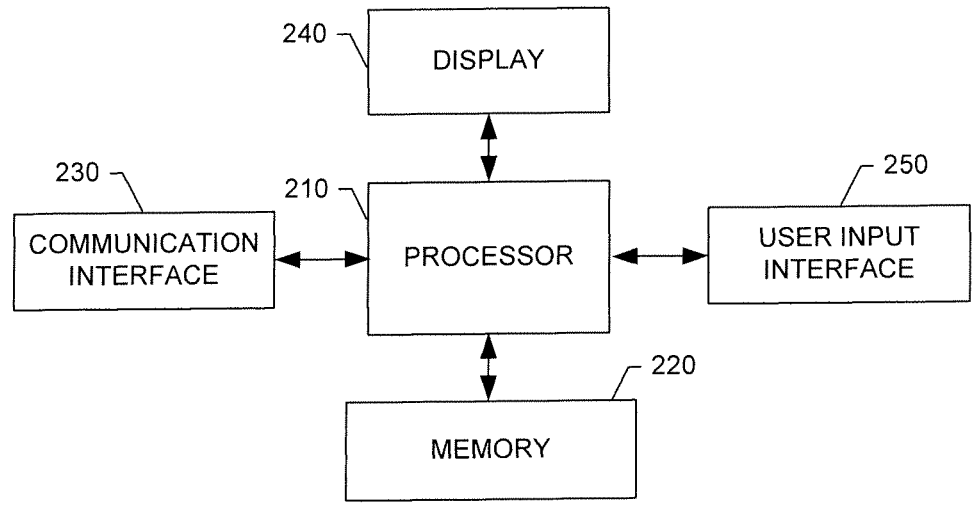
FIG. 5 is a schematic block diagram of an entity capable of operating as a Host and/or Presence Server in accordance with exemplary embodiments of the present invention.

Referring now to FIG. 5, a block diagram of an entity capable of operating as a Host Server 22 and/or Presence Server 24 is shown in accordance with one embodiment of the present invention. The entity capable of operating as a Host Server 22 and/or Presence Server 24 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. As shown, the entity capable of operating as a Host Server 22 and/or Presence Server 24 can generally include means, such as a processor 210 connected to a memory 220, for performing or controlling the various functions of the entity. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data from a user, such as a keypad, a touch display, a joystick or other input device.

Figure 6:
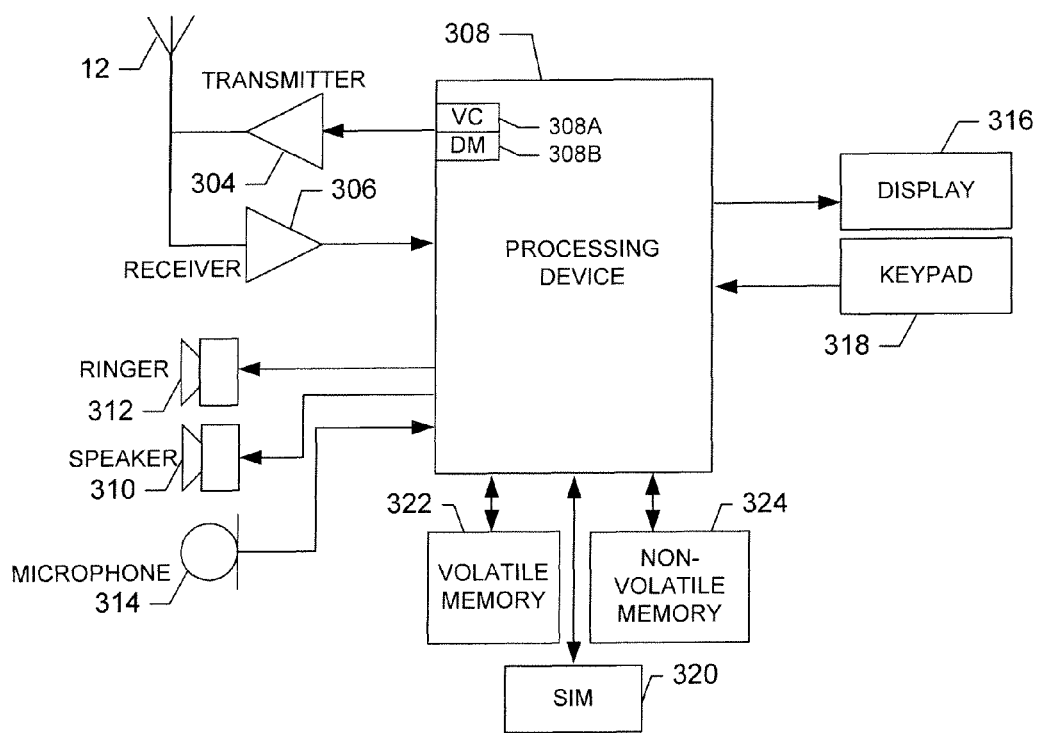
FIG. 6 is a schematic block diagram of an electronic device capable of operating in accordance with an exemplary embodiment of the present invention.

Reference is now made to FIG. 6, which illustrates one type of electronic device that would benefit from embodiments of the present invention. As shown, the electronic device may be a mobile station 10, and, in particular, a cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

The mobile station includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 6, in addition to an antenna 302, the mobile station 10 includes a transmitter 304, a receiver 306, and means, such as a processing device 308, e.g., a processor, controller or the like, that provides signals to and receives signals from the transmitter 304 and receiver 306, respectively. These signals include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 308, such as a processor, controller or other computing device, includes the circuitry required for implementing the video, audio, and logic functions of the mobile station and is capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 308 thus also includes the functionality to convolutionally encode and interleave message and data prior to modulation and transmission. The processing device can additionally include an internal voice coder (VC) 308A, and may include an internal data modem (DM) 308B. Further, the processing device 308 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 310, a ringer 312, a microphone 314, a display 316, all of which are coupled to the controller 308. The user input interface allows the mobile device to receive data, such as a selection, by a user associated with the mobile device, of one or more content files the user desires to share with another party (in accordance with Step 102 of FIG. 1, discussed above) and/or a selection of the contact entry associated with that party (in accordance with Step 103 of FIG. 1). The user interface may comprise any of a number of devices allowing the mobile device to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 320, a removable user identity module (R-UIM) (not shown), or the like, which typically stores information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), Memory Sticks as manufactured by Sony Corporation, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, in one embodiment of the present invention, the memory may store computer program code for creating a personal resource file including information relating to one or more devices associated with a party, accessing the resource file associated with a contact with whom a user associated with the mobile device desires to share content, determining a manner in which to share the content based, at least in part on the resource file accessed, and ultimately sharing the content in the manner determined (in accordance with Steps 101, 104, 105 and 106, respectively, of FIG. 1, discussed above).

The system, method, electronic device and computer program product of exemplary embodiments of the present invention are primarily described in conjunction with mobile communications applications. It should be understood, however, that the system, method, electronic device and computer program product of embodiments of the present invention can be utilized in conjunction with a variety of other applications, both in the mobile communications industries and outside of the mobile communications industries. For example, the system, method, electronic device and computer program product of exemplary embodiments of the present invention can be utilized in conjunction with wireline and/or wireless network (e.g., Internet) applications.

CONCLUSION

As described above and as will be appreciated by one skilled in the art, embodiments of the present invention may be configured as a system, method or electronic device. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these exemplary embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
  accessing, by an apparatus associated with a content offering user, a resource file of a content offered user, said resource file of the content offered user comprising respective content processing capability information of each of a plurality of first devices of the content offered user, and the first devices having different content processing capabilities;
  determining, by the apparatus, at least one of the first devices and a manner in which one or more content files stored at a plurality of second devices of the content offering user to be shared via a network with the at least one first device based, at least in part, on the content processing capability information;
  causing, at least in part by the apparatus, a transmission via the network to the at least one first device an invitation to access the one or more content files with a reference to a resource file of the content offering user, the resource file of the content offering user comprising at least one internet address and at least one short range wireless communication address of the one or more content files; and
  causing, at least in part by the apparatus, an update to the resource file of the content offering user with a relocation of at least one of the content files from one of the second devices to another one of the second devices, and one or more new addresses of the at least one content file in the another one of the second devices.

2. The method of claim 1, further comprising:
  determining protocols supported by the first devices based on the resource file of the content offered user,
  wherein the manner in which to share the one or more content files is further based at least in part on the protocols, and
  wherein the resource file of the content offered user further comprises one or more connectivity bearers supported by the first devices, one or more security settings supported by the first devices, or a combination thereof, and
  wherein the at least one short range wireless communication address is associated with accessing via a wireless local area network.

3. The method of claim 2, wherein the relocation occurs periodically, and wherein the at least one internet address is a uniform resource locator.

4. The method of claim 2, wherein the manner in which to share one or more content files comprises with which of the one or more first devices to share which of the one or more content files.

5. The method of claim 1 further comprising:
  receiving a selection by the content offering user of a contact entry associated with the content offered user, wherein the contact entry comprises an address at which the resource file of the content offered user can be accessed.

6. The method of claim 1, wherein the resource file of the content offered user is stored at at least one of the second devices of the content offering user, and synchronized with the resource file of the content offered user that is stored at at least one of the first device in a peer-to-peer basis, without user intervention.

7. The method of claim 1, wherein the resource file of the content offered user, the resource file of the content offering user, or a combination thereof, are stored and updated at a presence server.

8. The method of claim 1, wherein the resource file of the content offering user is stored at the at least one first device and synchronized with the resource file of the content offering user stored at at least one of the second device in a peer-to-peer basis, without user intervention.

9. The method of claim 1, wherein the manner in which to share the one or more content files comprises is determined based at least in part on content of the one or more content files to be shared, and
wherein the apparatus is embedded in one of the second devices of the content offering user.

10. The method of claim 1, wherein the resource file of the content offering user further comprises a reference to the one or more content files stored on respective second devices, and wherein the manner in which to share the one or more content files comprises a manner in which to access at least one of the content files referenced in the resource file of the content offering user.

11. The method of claim 10, wherein the resource file of the content offering user further comprises one or more protocols to use when accessing the one or more content files, one or more connectivity bearers to use when accessing the one or more content files, or a combination thereof.

12. The method of claim 11, wherein the resource file of the content offering user is automatically updated when a change occurs to at least one of the protocols to use when accessing the one or more content files, the connectivity bearer to use when accessing the one or more content files, or the address associated with respective content files referenced, without user intervention.

13. The method of claim 10, further comprising:
establishing a first connection with at least one of the second device on which the one or more content files are stored; and
automatically establishing a second connection with the at least one of the second devices if the first connection is lost.

14. The method of claim 2, further comprising:
automatically updating the resource file of the content offered user, the resource file of the content offering user, or a combination thereof, when a change occurs to at least one of the different content processing capabilities or the one or more connectivity bearers that are associated with processing the one or more content files to be shared, without user intervention; and
determining at least another one of the first devices and another manner in which the one or more content files stored at the second devices to be shared with the at least another one first device based, at least in part, on the updated resource file of the content offered user.

15. An apparatus comprising:
at least one processor and at least one memory including computer program code for one or more programs, the at least one memory and the computer program code configured to, with the at least one processor, cause the apparatus to perform at least the following:
store resource files each of which corresponds to a respective one of a plurality of users including a content offering user and a content offered user,
receive via a network a request by the content offering user to share one of more content files with the content offered user;
access one of the resource files that corresponds to the content offered user, wherein the resource file of the content offered user comprises respective content processing capability information of each of a plurality of first devices of the content offered user, and the first devices have different content processing capabilities;
determine at least one of the first devices and a manner in which the one or more content files stored at a plurality of second devices of the content offering user to be shared with the at least one first device based, at least in part, on the content processing capability information,
cause, at least in part, a transmission via the network to the at least one first device an invitation to access the one or more content files with a reference to a resource file of the content offering user, the resource file of the content offering user comprising at least one internet address and at least one short range wireless communication address of the one or more content files; and
cause, at least in part, an update to the resource file of the content offering user with a relocation of at least one of the content files from one of the second devices to another one of the second devices, and one or more new addresses of the at least one content file in the another one of the second devices.

16. The apparatus of claim 15, wherein each of the respective resource files comprises one or more connectivity bearers supported by, one or more security settings supported by, or a combination thereof, of respective devices associated with the corresponding user.

17. The apparatus of claim 15, wherein the apparatus is accessible via a wide area network, and wherein respective resource files stored in the apparatus have a corresponding address associated therewith.

18. The apparatus of claim 15, wherein the apparatus comprises a presence server, and wherein the memory further stores one or more presence documents associated with respective users, wherein respective presence documents comprise the resource file corresponding with the respective user.

19. The apparatus of claim 15, wherein the apparatus is further configured, upon execution, to:
determine an identity associated with a user accessing at least one of the resource files; and
determine whether the user is authorized to access at least part of the at least one resource file.

20. The apparatus of claim 19, wherein the apparatus is further configured, upon execution, to:
modify the at least one resource file prior to providing access thereto.

21. The apparatus of claim 20, wherein modifying the at least one resource file comprises encrypting the information included in the at least one resource file.

22. The apparatus of claim 20, wherein modifying the at least one resource file comprises removing at least a part of the at least one resource file, where it is determined that the party is not authorized to access the part removed.

23. An apparatus comprising:
at least one processor and at least one memory including computer program code for one or more programs, the at least one memory and the computer program code configured to, with the at least one processor, cause the apparatus associated with a content offering user to perform at least the following:

cause, at least in part, an update to a presence document of the at least one content file with the relocation and one or more new addresses of the at least one content file in the another device;

access a resource file of a content offered user, said resource file of the content offered user comprising respective content processing capability information of each of a plurality of first devices of the content offered user, and the first devices having different content processing capabilities;

determine at least one of the first devices and a manner in which one or more content files stored at a plurality of second devices of the content offering user to be shared via a network with the at least one first device based, at least in part, on the content processing capability information;

cause, at least in part, a transmission via the network to the at least one first device an invitation to access the one or more content files with a reference to a resource file of the content offering user, the resource file of the content offering user comprising at least one internet address and at least one short range wireless communication address of the one or more content files; and cause, at least in part, an update to the resource file of the content offering user with a relocation of at least one of the content files from one of the second devices to another one of the second devices, and one or more new addresses of the at least one content file in the another one of the second devices.

24. The apparatus of claim 23, wherein the resource file of the content offered user further comprises one or more connectivity bearers supported by the first devices, one or more security settings supported by the first devices, or a combination thereof.

25. The apparatus of claim 24, wherein the manner in which to share the one or more content files includes a combination of a protocol, a connectivity bearer and an address to use for sharing the one or more content files with the content offered user.

26. The apparatus of claim 24, wherein the manner in which to share the one or more content files includes with which of the first devices to share which of the one or more content files.

27. The apparatus of claim 23, wherein the apparatus is further caused to:
receive a selection by the content offering user of a contact entry associated with the content offered user, wherein the contact entry comprises an address at which the resource file of the content offered user can be accessed.

28. The apparatus of claim 23, wherein the apparatus is further caused to:
receive a selection by the content offering user of a contact entry associated with the content offered user; and
access a presence server for a presence document associated with the contact entry selected.

29. The apparatus of claim 28, wherein the presence document comprises the resource file of the content offered user.

30. The apparatus of claim 28, wherein the presence document comprises an address at which the resource file of the content offered user can be accessed.

31. The apparatus of claim 23, wherein the manner is determined based at least in part on the one or more content files to be shared.

32. The apparatus of claim 23, wherein the resource file of the content offering user further comprises a reference to the one or more content files stored on respective second devices, and wherein the manner in which to share the one or more content files comprises a manner in which to access at least one of the content files referenced in the resource file of the content offering user.

33. The apparatus of claim 32, wherein the resource file of the content offering user further comprises one or more protocols to use when accessing the one or more content files, one or more connectivity bearers to use when accessing the one or more content files, or a combination thereof.

34. The apparatus of claim 33, wherein the resource file of the content offering user is automatically updated when a change occurs to at least one of the protocols to use when accessing the one or more content files, the connectivity bearer to use when accessing the one or more content files, or the address associated with respective content files referenced, without user intervention.

35. The apparatus of claim 32, wherein the apparatus is further caused to:
establish a first connection with at least one of the second device on which the one or more content files are stored; and
automatically establish a second connection with the at least one of the second devices if the first connection is lost.

36. The apparatus of claim 23, wherein the apparatus is further caused to:
automatically update the resource file of the content offered user, the resource file of the content offering user, or a combination thereof, when a change occurs to at least one of the different content processing capabilities, or the connectivity bearers associated with processing the one or more content files to be shared, without user intervention.

37. The apparatus of claim 23, wherein the apparatus is embodied in the form of an electronic device.

38. A non-transitory computer-readable storage medium carrying one or more sequences of one or more instructions which, when executed by one or more processors, cause an apparatus associated with a content offering user to at least perform the following steps:
causing, at least in part, an update to a presence document of the at least one content file with the relocation and one or more new addresses of the at least one content file in the another device;
accessing a resource file of a content offered user, said resource file of the content offered user comprising respective content processing capability information of each of a plurality of first devices of the content offered user, and the first devices having different content processing capabilities;
determining at least one of the first devices and a manner in which one or more content files stored at a plurality of second devices of the content offering user to be shared via a network with the at least one first device based, at least in part, on the content processing capability information;
causing, at least in part, a transmission via the network to the at least one first device an invitation to access the one or more content files with a reference to a resource file of the content offering user, the resource file of the content offering user comprising at least one internet address and at least one short range wireless communication address of the one or more content files, and causing, at least in part, an update to the resource file of the content offering user with a relocation of at least one of the content files from one of the second devices to another one of the second devices, and one or more new addresses of the at least one content file in the another one of the second devices.

39. The non-transitory computer-readable storage medium of claim 38, the resource file of the content offered user further comprises one or more connectivity bearers supported by the first devices, one or more security settings supported by the first devices, or a combination thereof.

40. The non-transitory computer-readable storage medium of claim 39, wherein the manner in which to share the one or more content files includes a combination of a protocol, a connectivity bearer and an address to use for sharing the one or more content files with the content offered user.

41. The non-transitory computer-readable storage medium of claim 39, wherein manner in which to share the one or more content files includes with which of the first devices to share which of the one or more content files.

42. The non-transitory computer-readable storage medium of claim 38, wherein the apparatus is caused to further perform:
receiving a selection by the content offering user of a contact entry associated with the content offered user, wherein the contact entry comprises an address at which the resource file of the content offered user can be accessed.

43. The non-transitory computer-readable storage medium of claim 38, wherein the apparatus is caused to further perform:
receiving a selection by the content offering user of a contact entry associated with the content offered user; and
accessing a presence server for a presence document associated with the contact entry selected.

44. The non-transitory computer-readable storage medium of claim 38, wherein the resource file of the content offering user further comprises a reference to the one or more content files stored on respective second devices, and wherein the manner in which to share the one or more content files comprises a manner in which to access at least one of the content files referenced in the resource file of the content offering user.

45. The non-transitory computer-readable storage medium of claim 44, wherein the resource file of the content offering user further comprises one or more protocols to use when accessing the one or more content files, one or more connectivity bearers to use when accessing the one or more content files, or a combination thereof.

46. The non-transitory computer-readable storage medium of claim 38, wherein the apparatus is caused to further perform:
automatically updating the resource file of the content offered user, the resource file of the content offering user, or a combination thereof, when a change occurs to at least one of the different content processing capabilities or the one or more connectivity bearers that are associated with processing the one or more content files to be shared, without user intervention.

47. A system comprising:
a database comprising resource files each of which corresponds to a respective one of a plurality of users including a content offering user and a content offered user; and
an apparatus that is associated with the content offering user and configured to access one of the resource files that corresponds to the content offered user, wherein the resource file of the content offered user comprises respective content processing capability information of each of a plurality of first devices of the content offered user, and the first devices have different content processing capabilities,
to determine at least one of the first devices and a manner in which one or more content files stored at a plurality of second devices of the content offering user to be shared via a network with the at least one first device based, at least in part, on the content processing capability information,
to cause, at least in part, a transmission via the network to the at least one first device an invitation to access the one or more content files with a reference to a resource file of the content offering user, the resource file of the content offering user comprising at least one internet address and at least one short range wireless communication address of the one or more content files; and
to cause, at least in part, an update to the resource file of the content offering user with a relocation of at least one of the content files from one of the second devices to another one of the second devices, and one or more new addresses of the at least one content file in the another one of the second devices.

48. The system of claim 47, wherein each of the respective resource files comprises one or more connectivity bearers supported by, one or more security settings supported by, or a combination thereof, of respective devices associated with the corresponding user.

49. The system of claim 48, wherein the manner in which to share the one or more content files comprises a combination of a protocol to use for sharing the one or more content files, a connectivity bearer to use for sharing the one or more content files, an address to use for sharing the one or more content files, and with which of the first devices to share which of the content files.

50. The system of claim 47 further comprising:
a server configured to store the database, wherein the server is accessible via a wide area network, and wherein respective resource files have a corresponding address associated therewith.

51. The system of claim 47 further comprising:
a presence server configured to store the database, wherein respective resource files are associated with the presence document associated with the corresponding user and stored on the presence server.

52. The system of claim 47, wherein the apparatus comprises an electronic device configured to store the database.

* * * * *